(12) United States Patent
Richter et al.

(10) Patent No.: US 9,550,255 B2
(45) Date of Patent: Jan. 24, 2017

(54) PROCESS AND APPARATUS FOR APPLYING LAYERS OF MATERIAL TO A WORKPIECE MADE OF TIAL

(75) Inventors: Karl-Hermann Richter, Markt Indersdorf (DE); Herbert Hanrieder, Hohenkammer (DE); Sonja Dudziak, Bietigheim-Bissingen (DE); Albert Grueninger, Leouberg (DE)

(73) Assignee: MTU Aero Engines GmbH, Munich (DE)

( * ) Notice: Subject to any disclaimer, the term of this patent is extended or adjusted under 35 U.S.C. 154(b) by 774 days.

(21) Appl. No.: 13/701,682

(22) PCT Filed: Jun. 16, 2011

(86) PCT No.: PCT/DE2011/001299
§ 371 (c)(1),
(2), (4) Date: Feb. 21, 2013

(87) PCT Pub. No.: WO2012/069029
PCT Pub. Date: May 31, 2012

(65) Prior Publication Data
US 2013/0143068 A1    Jun. 6, 2013

(30) Foreign Application Priority Data

Jul. 5, 2010   (DE) .................. 10 2010 026 084

(51) Int. Cl.
*B23K 9/04*      (2006.01)
*B32B 15/00*     (2006.01)
(Continued)

(52) U.S. Cl.
CPC ................ *B23K 37/00* (2013.01); *B23K 9/04* (2013.01); *B23K 10/027* (2013.01); *B23K 26/32* (2013.01);
(Continued)

(58) Field of Classification Search
CPC . B23K 10/027; B23K 26/322; B23K 26/3226; B23K 26/3273; B23K 26/345; B23K 26/421; B23K 35/325; B23K 35/327; B23K 37/00; B23K 9/04; F01D 5/005; F01D 5/225; F01D 5/288; F05D 2230/31
(Continued)

(56) References Cited

U.S. PATENT DOCUMENTS 2,612,442 A *  9/1952  Goetzel ................. 428/555
4,732,778 A    3/1988  Kawasaki et al.
(Continued)

FOREIGN PATENT DOCUMENTS

CA    2005527 A1    8/1990
DE    39 42 051     8/1990
(Continued)

*Primary Examiner* — Dana Ross
*Assistant Examiner* — Ket D Dang
(74) *Attorney, Agent, or Firm* — Davidson, Davidson & Kappel, LLC

(57) ABSTRACT

A method for depositing material layers on a workpiece made of a material which contains a titanium aluminide includes the steps of: preparing the workpiece; heating the workpiece in a localized region by induction to a predefined preheating temperature; and depositing an additive, preferably in powder form, on the heated surface of the workpiece by build-up welding, in particular laser build-up welding, plasma build-up welding, micro-plasma build-up welding, TIG build-up welding or micro-TIG build-up welding; the additive including a titanium aluminide.

31 Claims, 1 Drawing Sheet

(51) Int. Cl.
  B23K 37/00 (2006.01)
  B23K 10/02 (2006.01)
  B23K 35/32 (2006.01)
  F01D 5/00 (2006.01)
  F01D 5/22 (2006.01)
  F01D 5/28 (2006.01)
  B23K 26/32 (2014.01)

(52) U.S. Cl.
  CPC ............ B23K 26/342 (2015.10); B23K 26/60 (2015.10); B23K 35/325 (2013.01); B23K 35/327 (2013.01); F01D 5/005 (2013.01); F01D 5/225 (2013.01); F01D 5/288 (2013.01); B23K 2203/10 (2013.01); B23K 2203/14 (2013.01); B23K 2203/18 (2013.01); B23K 2203/52 (2015.10); F05D 2230/31 (2013.01); Y10T 428/12639 (2015.01)

(58) Field of Classification Search
  USPC ............ 219/76.1, 73.11, 73.21, 78.01, 85.1, 219/85.13, 78.02, 78.12, 83, 121.1, 1, 121.15, 219/121.25, 121.36, 121.6, 129, 136, 148, 149; 427/250; 428/636; 148/641, 639; 228/214, 228/256
  See application file for complete search history.

(56) References Cited

U.S. PATENT DOCUMENTS

| | | | | |
|---|---|---|---|---|
| 5,190,603 A | * | 3/1993 | Nazmy | C22F 1/183 148/670 |
| 5,554,837 A | | 9/1996 | Goodwater | |
| 5,558,729 A | * | 9/1996 | Kim | B22F 3/24 148/670 |
| 5,785,775 A | * | 7/1998 | Smashey | B23K 9/0026 148/527 |
| 5,830,289 A | * | 11/1998 | El-Soudani | B23K 11/0093 148/524 |
| 6,160,237 A | * | 12/2000 | Schneefeld | B23K 20/1205 219/601 |
| 6,218,000 B1 | * | 4/2001 | Rudolf | B01D 39/1692 264/122 |
| 6,843,866 B2 | * | 1/2005 | Brenner et al. | 148/525 |
| 6,923,934 B2 | * | 8/2005 | Nishikiori | C22F 1/183 148/422 |
| 2002/0155316 A1 | * | 10/2002 | Zheng | 428/678 |
| 2003/0012925 A1 | * | 1/2003 | Gorrell | H01L 21/30608 428/137 |
| 2003/0035964 A1 | * | 2/2003 | Richard | H01S 5/021 428/446 |
| 2004/0027220 A1 | * | 2/2004 | Gunther | H01F 1/15308 335/297 |
| 2004/0191064 A1 | | 9/2004 | Guo | |
| 2005/0067064 A1 | | 3/2005 | Babu et al. | |
| 2005/0155960 A1 | * | 7/2005 | Bonnet | B23K 26/1429 219/137 WM |
| 2005/0173496 A1 | * | 8/2005 | Sato et al. | 228/214 |
| 2006/0236765 A1 | | 10/2006 | Bouet et al. | |
| 2007/0202351 A1 | * | 8/2007 | Justin et al. | 428/660 |
| 2008/0014457 A1 | | 1/2008 | Gennaro et al. | |
| 2009/0123268 A1 | | 5/2009 | Brittingham et al. | |

FOREIGN PATENT DOCUMENTS

| | | |
|---|---|---|
| DE | 10 2008 037 521 A1 | 5/2009 |
| DE | 60 2006 000 955 T2 | 5/2009 |
| EP | 0 287 371 | 10/1988 |

* cited by examiner

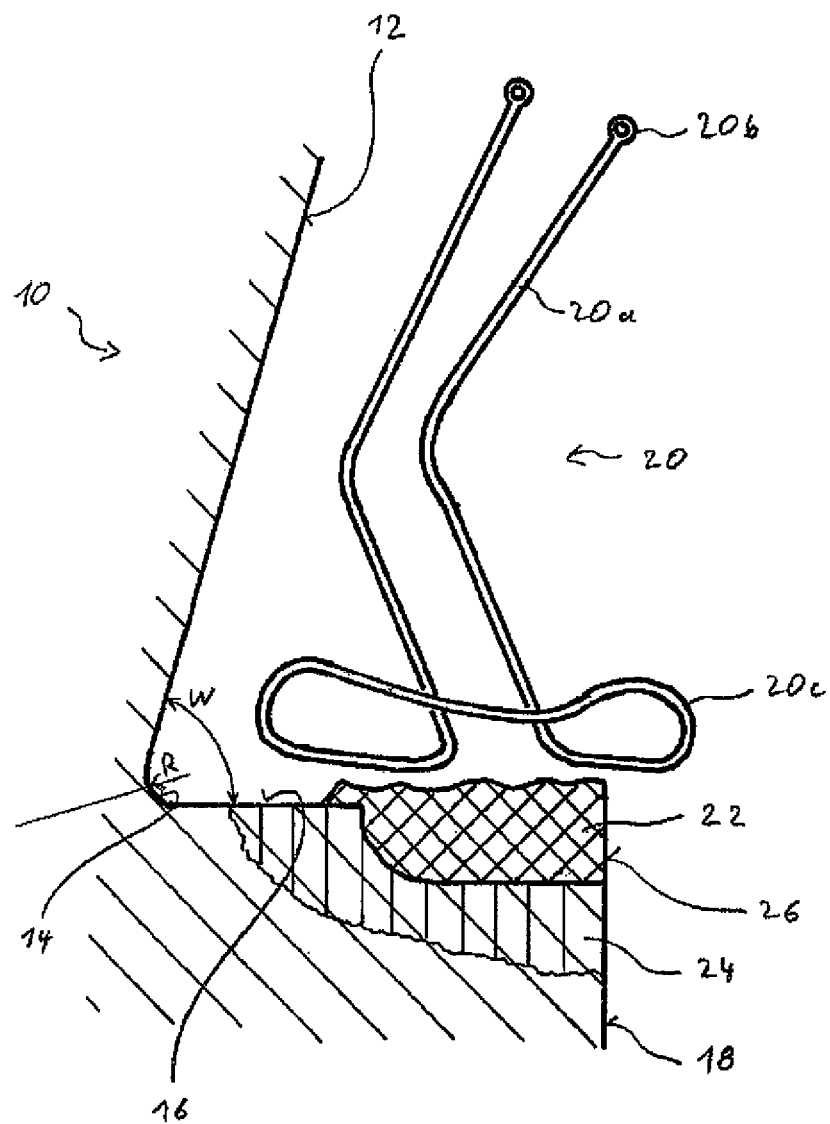

PROCESS AND APPARATUS FOR APPLYING LAYERS OF MATERIAL TO A WORKPIECE MADE OF TIAL

The present invention relates to a method for depositing layers of material on a workpiece made of TiAl, in particular for purposes of surface enhancement, hardfacing, repair, or for manufacturing workpieces from TiAl, and to a corresponding apparatus, as well as to a workpiece manufactured using such a method.

BACKGROUND

Materials made of titanium aluminides (TiAl) are considered to be unsuitable for fusion welding and, therefore, also as unsuitable for build-up welding.

German Patent Publication DE 60 2006 000 955 T2 describes a method for repairing turbine blades made of, for example, Ti17 or RA6V by laser powder build-up welding, where a powder material which is of the same kind, but not necessarily identical, and which has a grain size of preferably between 30 and 100 μm is delivered through a nozzle that is concentric with the laser beam.

A method for fabricating articles by deposition of successive layers is known from German Patent Publication DE 39 42 051 A1. The method is exemplified for complete build-up or repair of a compressor blade. In this process, a substrate is surface-melted by a laser beam in an inert gas atmosphere, and a preheated powder is fed laterally to the melted region using an inert carrier gas and incorporated by fusion. After solidification of the melt, the process is repeated to deposit the next layer. The layer thickness is, for example, 0.38 mm, and Ti-6Al-4V (also known as RA6V) is mentioned as a material for the substrate and the powder.

However, the difficulties in build-up welding of titanium aluminides persist. Due to the high melting temperature of TiAl, it is difficult to suitably control the temperature profile and to manage the thermal stresses in the component. This problem occurs in particular, but not exclusively, in repair and hardfacing processes where only a localized region of a component is thermally affected. It is particularly difficult to perform build-up welding near abrupt, in particular acute-angle changes in the contour of, for example, notches and the like. Examples include Z-notches of turbine blades, where a flank of the notch is hardfaced near the notch radius so that it will be able to resist the high mechanical stresses. Information on the function and an exemplary shape of a Z-notch on a rotor blade tip shroud of a turbine stage can be found, for example, in German Patent Publication DE 10 2008 037 521 A1.

United States Patent Publication US 2005/0067064 A1 describes a laser build-up welding method for depositing a steel powder alone or a mixture thereof with TiC—, TiN- or WC powder on a steel substrate. The process is a two-stage process where first the powder material is placed in a layer having a thickness of 0.08" and a width of 0.2" and is then incorporated by fusion using a laser beam. A similar method for coating a substrate of an aluminum alloy with a TiC powder alone or in a mixture with Si and/or Cu is disclosed in U.S. Pat. No. 4,732,778.

SUMMARY OF THE INVENTION

It is an object of the present invention to improve the deposition of layers of material on a substrate material made of or including a titanium aluminide, in particular for purposes of surface enhancement, hardfacing, dimensional correction, repair, or for build-up of a workpiece made of or including a titanium aluminide.

The present invention provides a method for depositing layers of material on a substrate material made of TiAl, an apparatus for depositing layers of material on a substrate material made of TiAl, and corresponding product obtained by the method.

The present discovery is based on the idea that localized, predetermined preheating of the component may limit the additional energy required for build-up welding and reduce the thermally affected region of the component, that controlling the temperature profile even after the welding operation may reduce component stress, and that inductive heating may well satisfy the requirements mentioned.

In accordance with the present invention, a method for depositing one or more layers of material on a workpiece made of a material which contains or consists of a titanium aluminide includes the steps of:

preparing the workpiece, if necessary;

heating the workpiece in a localized region by induction to a predefined preheating temperature; and depositing an additive, preferably in powder form, on the heated surface of the workpiece by build-up welding, in particular laser build-up welding, plasma build-up welding, micro-plasma build-up welding, TIG build-up welding or micro-TIG build-up welding; said additive including a titanium aluminide.

A "titanium aluminide" as understood in the context of the present invention is, for example, but not limited to, TNB, TNM, $\beta2$-Ti3Al or $\gamma$-TiAl or a mixture thereof and/or with other intermetallic phases of titanium and aluminum. Also included may be multiphase alloys of titanium and aluminum. In the present invention, it is irrelevant for materials which "consist of" titanium aluminide if they contain impurities. In accordance with the present invention, the material may contain a titanium aluminide, this being understood to be single-phase or multi-phase alloys, in particular superalloys, including a titanium aluminide or titanium aluminides. In the present invention, an additive that "includes" a titanium aluminide, may contain the titanium aluminide as the only component. In this description, all "titanium aluminides" in the above sense are summarized under the abbreviation "TiAl".

The term "prepare" may be understood to mean solely the clamping of the workpiece. The preparation step may also include cleaning of a surface that is intended for deposition, cutting free of a damaged site or the like, and/or other preparatory steps.

The inventors have found that it is sufficient that the preheating temperature be above a critical temperature of a brittle-ductile phase transition of the material. In the case of TiAl, this critical temperature may be found, in particular, to be between 700° C. and 800° C. In this case, the total heat input may be controlled in such a way that only a localized region is thermally affected, thus allowing effective control of thermal stresses.

If the coating is intended to form a hardfacing on the workpiece, it is advantageous if the additive includes a hard material, in particular, titanium carbide, titanium boride, boron nitride, or the like, or a mixture thereof. The content of hard material, in particular of titanium carbide, in the additive may preferably be between 15% and 90%.

The inventors have further found that a suitable average grain size of the titanium aluminide in the additive is in a range from 25 to 75 μm, and that a suitable average grain size of the titanium carbide is in a range from 3 to 45 μm.

In the method, the deposition step itself may include two stages, where first the additive powder is deposited on the surface of the workpiece before, during or after the heating of the workpiece, and then the deposited additive is melted by a laser beam or a plasma jet. Alternatively, the additive powder may be delivered in a single-stage process through a nozzle coaxial with a laser beam or plasma jet or laterally to a laser beam or plasma jet.

Particular flexibility with respect to strength and surface properties can be achieved when the addition of the additive and its composition are controlled in such a way that they vary from region to region.

Moreover, it has proved practical to deposit the additive in a plurality of adjacent lines having a width of preferably from 0.2 to 5 mm and a thickness of preferably from 0.1 to 3 mm, the lines preferably overlapping each other, and a degree of overlap of adjacent lines particularly preferably being 50 to 90%.

Furthermore, it has turned out to be particularly advantageous if, after deposition, the workpiece is cooled at a defined cooling rate to a cooling temperature of preferably between 500° C. and 650° C., the cooling rate preferably being between 5 K/min and 50 K/min. This may be followed by uncontrolled cooling to room temperature.

The method may be used, for example, for surface enhancement, hardfacing, dimensional correction, or repair of a workpiece made of a material which contains or consists of a titanium aluminide. More specifically, it may be used for hardfacing, dimensional correction, or repair of a surface of a side of a preferably acute-angled notch of a component made of a material which contains or consists of a titanium aluminide.

In this process, a workpiece zone that is heated above a predetermined critical temperature in the process does not reach the region of a notch radius, and/or a coil used for inductive heating of the workpiece is adapted to the shape of the notch.

The method may be used for hardfacing, dimensional correction, or repair of a functional surface of a Z-notch of a turbine blade tip shroud, a sealing fin on a turbine blisk, a tip shroud of a compressor rotor blade, or a housing part of a fluid flow machine, said objects being made of a material which contains or consists of a titanium aluminide.

The method may also be used for manufacturing a workpiece, in particular a turbine or compressor blade or a turbine or compressor housing or a part thereof. In this process, first a substrate made of a material which contains or consists of a titanium aluminide is prepared, and then layers of an additive are deposited using the above-described method until a predetermined contour of the workpiece is formed.

An apparatus for depositing layers of material on a workpiece made of a material which contains or consists of a titanium aluminide, where the deposition is accomplished by build-up welding, in particular laser build-up welding, plasma build-up welding, micro-plasma build-up welding, TIG build-up welding or micro-TIG build-up welding, includes a holding device for holding a workpiece, a feeding device for feeding an additive powder including a titanium aluminide, a melting device for melting the additive, which melting device may be adapted to produce a laser beam or a plasma jet and to direct the laser beam or plasma jet toward the workpiece, the apparatus further including a preheating device for preheating the workpiece and being configured and adapted to perform the above-described method, said preheating device in particular being configured and adapted for localized inductive heating of a surface of the workpiece.

The local inductive preheating according to the present invention makes it possible, in particular, to ensure that, for example, in the area around a radius of a notch, a predetermined further critical temperature is not exceeded. In addition to the material, this further critical temperature, which is to be observed as an upper limit, may also depend on the shape or geometry of the notch.

In order both to observe this upper limit and to reach a lower limit determined by the preheating temperature, it is preferred to provide an induction coil that is suitably selected, in particular in terms of its material, geometry and/or its power and/or its position. In particular, heating to a temperature not above the predetermined further critical temperature in a zone of the workpiece, such as the above-mentioned notch, can be ensured in that the local heating by induction does not exceed a predetermined second critical temperature. The second and the further critical temperatures may be the identical. However, considering the conduction and transfer of heat between the zone for which the further critical temperature is determined and the locally heated region, the second temperature may, for example, also be higher.

In a preferred embodiment, layers of material are deposited until a desired shape of the workpiece is reached or overfilled; i.e., exceeded. In the latter case, the deposited material layers may be finished, for example, by machining, until the desired workpiece shape is reached.

Further features and advantages will become apparent from additional dependent claims and the exemplary embodiments and modifications.

BRIEF DESCRIPTION OF THE DRAWING

FIG. 1 shows a build-up welding application in which a Z-notch of a rotor blade.

DETAILED DESCRIPTION

The single FIGURE schematically illustrates, as a preferred exemplary embodiment of the present invention, a build-up welding application in which a Z-notch of a rotor blade 10 which forms part of a low-pressure turbine (LPT) and is made of a titanium aluminide (TiAl) with titanium carbide (TiC) is inductively preheated.

In the Z-notch area shown, rotor blade 10 has a flank 12 which merges via a transition region 14 into a shoulder 16. Transition region 14 may also be referred to as a notch 14 in a narrower sense. A notch radius R of notch 14 is small compared to the dimensions of the component; a notch angle W of notch 14 is smaller than 90°. The shoulder merges downward into a side 18 at a right angle. Of course, other shoulder angles are also possible.

The region of the Z-notch that is to be hardfaced is located on the surface of shoulder 16. When welding is performed at this site, it is important that the temperature in the area around notch 14 does not exceed a further critical value. A coil 20 is used which has a specifically adapted shape and position. Coil 20 has two lead wires 20a having terminal eyelets 20b. Lead wires 20a extend substantially parallel to each other, and their main orientation follows the contour of flank 12. Lead wires 20a end over an outer region of shoulder 16 and widen into a loop forming a foot 20c. Foot 20c extends over shoulder 16 at a uniform distance therefrom.

Using coil 20, the surface of shoulder 16 is locally selectively heated to a preheating temperature above a critical temperature of the brittle-ductile phase transition of the TiAl material, which is typically between 700° C. and 800° C. Then, an additive is deposited on the preheated surface of shoulder 16 using a deposition device (not specifically shown). Deposition is performed using a generally known laser powder build-up welding method. Upon completion of the laser beam build-up welding process, cooling is performed at a defined cooling rate between 5 K/min and 50 K/min to a temperature of typically 500° C. to 650° C. This is followed by self-cooling to room temperature.

A mixture of TiAl powder with TiC particles is used as the additive. The TiAl powder has an average grain size of 25 μm to 75 μm, and the TiC particles have a size from 3 μm to 45 μm. The content of TiC particles in the TiAl/TiC mixture is between 15% and 90%.

The powder mixture is transported by an inert material, preferably a noble gas such as argon, deposited on the preheated region of shoulder 16 through a nozzle coaxially or laterally with respect to a laser beam, and is melted and fusion-bonded by the laser beam. The laser power is typically 80 W to 4000 W. Preferably, a plurality of lines are fusion-bonded side by side in overlapping relationship and in several layers at an average advance rate of 100 mm/min to 1500 mm/min. The line width is typically 0.2 mm to 5 mm, the line thickness is typically 0.1 mm to 3 mm, and the degree of overlap is typically 50% to 90%.

A fusion-bonded layer 22 is formed which is integrally attached to the substrate material of blade 10. Due to the special preheating method employed, the total heat input by the preheating and the laser beam can be restricted to a thermally affected zone 24 which does not include transition region (notch radius) 14.

After the fusion-bonding, fusion-bonded layer 22 is finished to create a smooth surface having the desired dimensions. In the FIGURE, fusion-bonded layer 22 is shown with a finished face 26 in the area of side 18.

The method of the present invention enables the temperature profile to be controlled in an advantageous manner. In particular, by the local preheating, it can be achieved that thermally affected zone 24 does not reach the critical transition region 14, and that transition region 14 therefore remains substantially free of thermally induced changes and thermal stresses; i.e., that its temperature remains below a further critical temperature. In this context, the term "thermally affected" is understood to refer to a technically relevant heating above a known critical temperature limit in the above sense. Of course, it is understood that a slight heating of transition region 14 to an extent that is irrelevant in the above sense is often unavoidable, but is acceptable and, in particular, is also encompassed by the method of present invention. Inductive preheating also has the advantage that a controlled and defined cooling rate can be easily achieved. By controlled cooling, it is also it possible to reduce thermal stresses.

The method described above is not limited to Z-notches of turbine blades. It may be used, quite generally, for surface enhancement, hardfacing, dimensional correction, or repair of a workpiece made of a titanium aluminide, and even for manufacturing such a workpiece by building it up in layers. The use of hard materials, such as, for example, TiC, may be limited to particularly stressed regions or be entirely dispensed with. Thus, the method described above may be generalized to a method for depositing layers of material on a substrate material, where the substrate material and the additive used for the deposited layers each include a titanium aluminide.

The method may, in particular, also be used for repair of turbine blades of, for example, a low-pressure turbine made of TiAl. Furthermore, it is possible to correct the dimensions of sealing fins by build-up welding using TiAl powder or, in the case of hardfacing, using a TiAl/TiC powder mixture. Moreover, worn Z-notches may be build-up welded with TiAl powder for dimensional correction, if necessary, and be hardfaced with a TiAl/TiC powder mixture again in the region that was originally hardfaced.

Another application of the described method is the repair of compressor rotor blades at the tips. Here, it is preferred to deposit a TiAl material of the same kind by laser powder build-up welding. Furthermore, the described method may be used to repair worn portions of housings made of TiAl alloys with a TiAl material of the same kind.

The method of the present invention has been described above in connection with a single-stage laser powder build-up welding method. In a modification, the powder mixture may also be deposited on the preheated surface in a first step, and fusion-bonded by a laser beam in a second step.

In further modifications, a (micro-) plasma or (micro-) TIG build-up welding method may be used in place of the laser powder build-up welding method. Here, too, the temperature is controlled in such a way that the component is preheated above the critical temperature of the brittle-ductile phase transition, and after the build-up welding process, it is cooled at a sufficiently slow cooling rate, and that the overall zone that is thermally affected is limited to a predetermined region.

Instead of TIC, other hard materials, such as titanium boride, boron nitride, for example, may also be deposited in a mixture with a TiAl powder to provide a hardfacing.

Although the disclosure was explained in detail above with reference to an exemplary embodiment, it will be readily apparent to those skilled in the art that numerous modifications may be made which are still within the scope of the invention as set forth in the appended claims.

What is claimed is:

1. A method for depositing at least one layer of material on a workpiece made of a material including a titanium aluminide, the method comprising the steps of:
    heating the workpiece in a localized region by induction to a predefined preheating temperature, the heating creating a heated surface of the workpiece;
    depositing an additive including the titanium aluminide on the heated surface of the workpiece by build-up welding, wherein the deposition step includes the steps of depositing the additive in powder form on the surface of the workpiece and melting the deposited additive by a laser beam or a plasma jet; and
    cooling the workpiece at a defined cooling rate to a cooling temperature, the cooling temperature being between 500° C. and 650° C., the defined cooling rate being between 5 K/min and 50 K/min.

2. The method as recited in claim 1 wherein the build-up welding includes at least one of: laser build-up welding, laser powder build-up welding, plasma build-up welding, micro-plasma build-up welding, TIG build-up welding and micro-TIG build-up welding.

3. The method as recited in claim 1 wherein the additive is in powder form.

4. The method as recited in claim 1 wherein the preheating temperature is at or above a critical temperature of a brittle-ductile phase transition of the material.

5. The method as recited in claim 4 wherein the preheating temperature is between 700° C. and 800° C.

6. The method as recited in claim 1 wherein the preheating temperature is below a predetermined second critical temperature of the material.

7. The method as recited in claim 1 wherein the additive includes a hard material.

8. The method as recited in claim 7 wherein the content of the hard material in the additive is between 15% and 90%.

9. The method as recited in claim 8 wherein the hard material is titanium carbide.

10. The method as recited in claim 7 wherein the hard material includes at least one of titanium carbide, titanium boride and boron nitride.

11. The method as recited in claim 1 wherein the titanium aluminide has an average grain size of 25 to 75 µm.

12. The method as recited in claim 11 wherein the additive includes a titanium carbide having an average grain size of 3 to 45 µm.

13. The method as recited in claim 1 wherein during the deposition step, the additive in powder form is delivered through a nozzle coaxial with a laser beam or plasma or laterally to a laser beam or plasma jet.

14. The method as recited in claim 1 wherein the addition of the additive and its composition are controlled in such a way that they vary from region to region.

15. The method as recited in claim 1 wherein a power of a laser used in the method is 80 W to 4000 W.

16. The method as recited in claim 1 wherein an advance rate is between 100 and 1500 mm/min.

17. The method as recited in claim 1 wherein the additive is deposited in a plurality of adjacent lines.

18. The method as recited in claim 17 wherein the lines have a width of 0.2 to 5 mm or a thickness of 0.1 to 3 mm.

19. The method as recited in claim 18 wherein the lines overlap each other.

20. The method as recited in claim 19 wherein a degree of overlap of the lines is 50 to 90%.

21. The method as recited in claim 1 further comprising uncontrolled further cooling of the workpiece to room temperature.

22. The method as recited in claim 1 wherein the material consists of the titanium aluminide.

23. A method for surface enhancement, hardfacing, dimensional correction, or repair of a workpiece made of a material including a titanium aluminide, the method comprising the steps of:
preparing the workpiece; and
depositing at least one layer on the workpiece, the depositing including:
heating the workpiece in a localized region by induction to a predefined preheating temperature, the heating creating a heated surface of the workpiece;
depositing an additive including the titanium aluminide on the heated surface of the workpiece by build-up welding, wherein the deposition step includes the steps of depositing the additive in powder form on the surface of the workpiece and melting the deposited additive by a laser beam or a plasma jet; and
cooling the workpiece at a defined cooling rate to a cooling temperature, the cooling temperature being between 500° C. and 650° C., the defined cooling rate being between 5 K/min and 50 K/min.

24. The method as recited in claim 23 wherein the workpiece includes a surface of a side of a notch of a component made of a material including titanium aluminide,
wherein a workpiece zone in a region of a notch radius is not heated above a predetermined further critical temperature of the material, which is primarily dependent on the shape of the notch, and wherein a coil used for inductive heating of the workpiece or its position relative to the notch is adapted to the notch.

25. The method as recited in claim 24 wherein the coil is adapted to a shape of the notch.

26. The method as recited in claim 24 wherein the notch is an acute-angled notch.

27. The method as recited in claim 24 wherein the material consists of the titanium aluminide.

28. The method as recited in claim 23 wherein the workpiece includes a functional surface of a Z-notch of a turbine blade tip shroud, a sealing fin on a turbine blisk, a tip shroud of a compressor rotor blade, or a housing part of a fluid flow machine.

29. A method for manufacturing a workpiece, the method comprising the steps of:
preparing a substrate made of a material including a titanium aluminide; and
depositing at least one layer of an additive until a predetermined contour of the workpiece is formed or overfilled, the depositing including:
heating the workpiece in a localized region by induction to a predefined preheating temperature, the heating creating a heated surface of the workpiece;
depositing the additive including the titanium aluminide on the heated surface of the workpiece by build-up welding, wherein the deposition step includes the steps of depositing the additive in powder form on the surface of the workpiece and melting the deposited additive by a laser beam or a plasma jet; and
cooling the workpiece at a defined cooling rate to a cooling temperature, the cooling temperature being between 500° C. and 650° C., the defined cooling rate being between 5 K/min and 50 K/min.

30. The method as recited in claim 29 wherein the material consists of the titanium aluminide.

31. The method as recited in claim 29 wherein the workpiece is a turbine or compressor blade or a turbine or compressor housing or a part thereof.

* * * * *